United States Patent
Liu et al.

(10) Patent No.: US 9,693,378 B2
(45) Date of Patent: Jun. 27, 2017

(54) MIMO WIRELESS COMMUNICATION SYSTEM, MIMO TRANSMISSION METHOD, AND APPARATUS

(71) Applicant: Huawei Technologies Co., Ltd., Shenzhen, Guangdong (CN)

(72) Inventors: Sheng Liu, Shenzhen (CN); Rongdao Yu, Shenzhen (CN); Rui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 14/528,651

(22) Filed: Oct. 30, 2014

(65) Prior Publication Data
US 2015/0049736 A1    Feb. 19, 2015

Related U.S. Application Data

(63) Continuation of application No. PCT/CN2012/081843, filed on Sep. 24, 2012.

(30) Foreign Application Priority Data

May 2, 2012  (CN) .......................... 2012 1 0133535

(51) Int. Cl.
*H04L 25/03* (2006.01)
*H04W 76/02* (2009.01)
(Continued)

(52) U.S. Cl.
CPC .......... *H04W 76/023* (2013.01); *H04B 7/026* (2013.01); *H04B 7/0413* (2013.01);
(Continued)

(58) Field of Classification Search
CPC ....... H04L 47/12; H04L 49/35; H04L 49/505; H04L 49/506; H04L 49/356
See application file for complete search history.

(56) References Cited

U.S. PATENT DOCUMENTS 8,406,691 B2 * 3/2013 Bogestam .............. G06Q 30/02
                                                     370/216
8,554,200 B2 * 10/2013 Ribeiro ............... H04W 72/082
                                                     455/422.1
(Continued)

FOREIGN PATENT DOCUMENTS

CN        102026307 A      4/2011
CN        102083138 A      6/2011
(Continued)

OTHER PUBLICATIONS

Stankovic et al, "Generalized Design of Multi-User MIMO Precoding Matrices," IEEE Transactions on Wireless Communications, pp. 953-961, vol. 7, No. 3, Institute of Electrical and Electronics Engineers, New York, New York (Mar. 2008).

*Primary Examiner* — Ricky Ngo
*Assistant Examiner* — Lan Huong Truong
(74) *Attorney, Agent, or Firm* — Leydig, Voit & Mayer, Ltd.

(57) ABSTRACT

Embodiments of the present invention provide a MIMO wireless communication system, a MIMO transmission method, and an apparatus, which relate to the field of communications technologies and are invented to effectively improve transmission efficiency and decrease a transmission delay. The MIMO wireless communication system includes: a base station, a first user equipment, and at least one second user equipment, where the first user equipment performs cellular uplink communication with the base station, and performs device-to-device communication with the at least one second user equipment, and the same time-frequency resource is used in the cellular uplink communication between the first user equipment and the base station and the device-to-device communication between the first user equipment and the second user equipment. The present (Continued)

invention is applicable to wireless communication technologies.

13 Claims, 6 Drawing Sheets

(51) Int. Cl.
  H04W 72/04 (2009.01)
  H04B 7/0413 (2017.01)
  H04B 7/0456 (2017.01)
  H04W 52/24 (2009.01)
  H04B 7/026 (2017.01)
  H04W 52/38 (2009.01)
  H04W 52/14 (2009.01)
  H04W 52/42 (2009.01)

(52) U.S. Cl.
  CPC ........ *H04B 7/0456* (2013.01); *H04W 52/242* (2013.01); *H04W 52/383* (2013.01); *H04W 72/04* (2013.01); *H04W 52/143* (2013.01); *H04W 52/42* (2013.01)

(56) References Cited

U.S. PATENT DOCUMENTS

| | | | | |
|---|---|---|---|---|
| 8,665,769 B2* | 3/2014 | Moulsley | ............ | H04B 7/0452 370/312 |
| 8,817,685 B2* | 8/2014 | Mukherjee | ............ | H04B 7/0456 370/310.2 |
| 8,954,502 B1* | 2/2015 | Kopikare | ............ | H04L 67/32 709/204 |
| 9,491,766 B2* | 11/2016 | Peng | ............ | H04B 7/15528 |
| 2007/0280175 A1 | 12/2007 | Cheng et al. | | |
| 2009/0017850 A1* | 1/2009 | Jovicic | ............ | H04W 52/34 455/501 |
| 2009/0310570 A1* | 12/2009 | Smith | ............ | H04W 76/023 370/335 |
| 2009/0325625 A1* | 12/2009 | Hugl | ............ | H04W 52/16 455/522 |
| 2010/0261469 A1* | 10/2010 | Ribeiro | ............ | H04W 99/00 455/423 |
| 2011/0106952 A1* | 5/2011 | Doppler | ............ | H04W 72/0406 709/226 |
| 2011/0211547 A1* | 9/2011 | Kim | ............ | H04B 7/024 370/329 |
| 2011/0237231 A1 | 9/2011 | Horneman et al. | | |
| 2012/0028672 A1* | 2/2012 | Chen | ............ | H04W 52/241 455/522 |
| 2012/0051315 A1* | 3/2012 | Wang | ............ | H04W 72/082 370/329 |
| 2012/0099540 A1 | 4/2012 | Doppler et al. | | |
| 2012/0257519 A1* | 10/2012 | Frank | ............ | H04L 5/0035 370/252 |
| 2013/0322388 A1* | 12/2013 | Ahn | ............ | H04W 76/023 370/329 |

FOREIGN PATENT DOCUMENTS

| | | |
|---|---|---|
| CN | 102204392 A | 9/2011 |
| CN | 102388541 A | 3/2012 |

* cited by examiner

MIMO WIRELESS COMMUNICATION SYSTEM, MIMO TRANSMISSION METHOD, AND APPARATUS

CROSS-REFERENCE TO RELATED APPLICATIONS

This application is a continuation of International Patent Application No. PCT/CN2012/081843, filed on Sep. 24, 2012, which claims priority to Chinese Patent Application No. 201210133535.7, filed on May 2, 2012, both of which are hereby incorporated by reference in their entireties.

FIELD OF THE INVENTION

The present invention relates to the field of communications technologies, and in particular, to a multiple-input multiple-output (MIMO) wireless communication system, a MIMO transmission method, and an apparatus.

BACKGROUND OF THE INVENTION

With the development of communication technologies and with the rapid development of manufacturing techniques, capabilities of a user equipment (UE) are getting greater, the number of the antennas configured in the UE become larger, and the MIMO technology attracts increasing attention. The MIMO technology means that multiple transmit antennas and receive antennas are used at a transmitting end and a receiving end respectively, and signals are transferred and received through the multiple antennas of the transmitting end and the receiving end, so as to greatly improve frequency spectrum utilization and enable a wireless communication system to transmit a data service at a higher rate.

An existing wireless communication system is generally a cellular communication system. In the cellular communication system, a centralized control manner is adopted. A base station (BS) performs centralized control and scheduling on radio resource management and establishment, maintenance, and release of all communication links, and all information of a user equipment is forwarded by the base station.

In the foregoing cellular communication system, because of such centralized control manner, transmission efficiency is relatively low and a transmission delay is relatively high. The UE can only implement MIMO transmission between the UE and the base station through scheduling of the base station, so that the frequency spectrum utilization is relatively poor.

SUMMARY OF THE INVENTION

Main objectives of embodiments of the present invention are to provide a MIMO wireless communication system, a MIMO transmission method, and an apparatus, so as to effectively improve transmission efficiency and decrease a transmission delay.

In order to achieve the foregoing objectives, the embodiments of the present invention adopt the following technical solutions:

In an aspect, an embodiment of the present invention provides a MIMO wireless communication system, including:

a BS, a first UE, and at least one second UE, where the first UE performs cellular uplink communication with the BS, and performs device-to-device D2D (Device-to-Device) communication with the at least one second UE; and the same time-frequency resource is used in the cellular uplink communication between the first UE and the BS and the D2D communication between the first UE and the second UE.

In an aspect, an embodiment of the present invention provides a MIMO transmission method, including:

performing, by a first UE, cellular uplink communication with a BS; and performing, by the first UE, D2D communication with at least one second UE, where the same time-frequency resource is used in the cellular uplink communication and the D2D communication.

In another aspect, an embodiment of the present invention provides a UE, including:

a first communication unit, configured to perform cellular uplink communication with a BS; and a second communication unit, configured to perform D2D communication with at least one second UE, where the same time-frequency resource is used in the cellular uplink communication and the D2D communication.

Through the MIMO wireless communication system, MIMO transmission method, and apparatus which are provided by the embodiments of the present invention, one UE not only can perform the cellular uplink communication with the BS, but also can perform the D2D communication with another UE, that is, two UEs can directly perform communication with each other without requiring the BS to perform forwarding, which not only can effectively reduce the occupancy of a BS resource, but also can effectively improve the transmission efficiency and decrease the transmission delay. In addition, because the same time-frequency resource is used in the D2D communication between the UE and another UE and the cellular uplink communication between the UE and the BS, the frequency spectrum efficiency of the wireless communication system can be effectively improved.

BRIEF DESCRIPTION OF THE DRAWINGS

To describe the technical solutions in the embodiments of the present invention or in the prior art more clearly, the following briefly introduces accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely part rather than all of the embodiments of the present invention. All other embodiments obtained by persons of ordinary skill in the art based on the embodiments of the present invention without creative efforts shall fall within the protection scope of the present invention.

Figure 1:
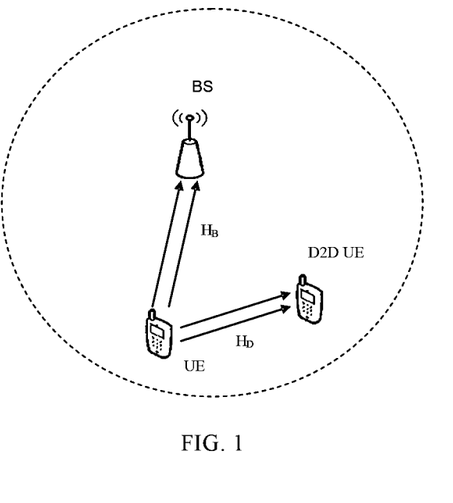
FIG. 1 is a schematic diagram of an embodiment of a MIMO wireless communication system according to the present invention.

FIG. 1 is a schematic diagram of an embodiment of a MIMO wireless communication system according to the present invention. As shown in FIG. 1, the MIMO wireless communication system provided by the embodiment of the present invention includes:

a BS, a UE (first UE), and a D2D UE (second UE), where the UE performs cellular uplink communication with the BS; and the UE performs D2D communication with the D2D UE, so as to form MIMO communication, and the same time-frequency resource is used in the cellular uplink communication between the UE and the BS and the D2D communication between the UE and the D2D UE.

Based on an existing cellular mobile communication system, the MIMO wireless communication system provided by this embodiment introduces a UE self-organizing communication manner, that is, a D2D communication manner. The D2D communication does not need to be controlled by the BS or an access node, so that the communication and networking are very flexible. Introducing the D2D communication to the existing cellular mobile communication system brings a series of advantages: first, a local service that is near at hand can be directly completed through relay forwarding between terminal devices without the BS, so as to reduce occupancy of a BS resource, and effectively improve transmission efficiency and decrease a transmission delay; second, a coverage defect of a preset network can also be remedied, and some coverage holes always existing in a coverage area of the existing cellular mobile communication system can be eliminated; third, power consumption can also be effectively decreased, and when the communication is implemented by several short paths instead of a long path, a sum of power of the several short paths is less than power required by the long path; and in addition, the capacity of the whole mobile communication system can be increased and space multiplexing can be increased.

In the MIMO wireless communication system provided by this embodiment, the UE not only can perform the cellular uplink communication with the BS, but also can perform the D2D communication with the D2D UE, that is, two UEs can directly perform communication with each other without requiring the BS to perform forwarding, so as to effectively reduce the occupancy of the BS resource, and effectively improve the transmission efficiency and decrease the transmission delay. In addition, because the same time-frequency resource is used in the D2D communication between the UE and another UE and the cellular uplink communication between the UE and the BS, the frequency spectrum efficiency of the wireless communication system can be effectively improved.

It should be noted that, the MIMO wireless communication system in this embodiment is described by taking an example where the UE performs D2D communication with a D2D UE, but the present invention is not limited thereto, and the UE can perform D2D communication with at least one D2D UE.

Because the same time-frequency resource is used in the cellular uplink communication between the UE and the BS and the D2D communication between the UE and the D2D UE, interference exists between the cellular uplink communication and the D2D communication. To control the interference between the cellular uplink communication and the D2D communication in the MIMO system in this embodiment, optionally, before communication data of the two kinds of communication is transmitted, the UE may select a specific precoding matrix to perform precoding processing on data transmitted in the cellular uplink communication and data transmitted in the D2D communication respectively, so as to reduce or eliminate the interference between the cellular uplink communication and the D2D communication, thereby implementing effective combination of cellular communication and the D2D communication and proper multiplexing of frequency spectrum resources, and thereby greatly improving the frequency spectrum efficiency of the system.

Specifically, the UE may use a first precoding matrix to perform precoding processing on the data transmitted in the cellular uplink communication, so as to make interference of the cellular uplink communication in the device-to-device communication lower than a first specified threshold; and the UE uses a second precoding matrix to perform precoding processing on the data transmitted in the D2D communication, so as to make interference of the D2D communication in the cellular uplink communication lower than a second specified threshold. Definitely, it is most desirable to limit the interference between the two kinds of communication to zero.

It should be noted that, the first specified threshold and the second specified threshold may be the same and may also be different, which is not limited in the present invention. It should be understood that, for a wireless communication system having multiple second UEs, the UE adopts a second precoding matrix for the D2D communication between the UE and each second UE.

For example, without loss of generality, it is assumed that a cellular uplink transmission channel from the UE to the BS is $H_B$, transmission data is $S_B$, a precoding matrix is $W_B$ (the first precoding matrix), a D2D link channel between the UE and the D2D UE is $H_D$, D2D transmission data is $S_D$, and a precoding matrix is $W_D$ (the second precoding matrix), so that for the cellular uplink transmission performed between the UE and the BS, a signal received by a BS side is:

$$y_1 = H_B W_B S_B + H_B W_D S_D + n_B \quad (1)$$

In equation (1), the first term $H_B W_B S_B$ is a signal that the BS expects to receive, $H_B W_D S_D$ is interference caused by the D2D communication, and $n_B$ is noise. To eliminate the interference caused by D2D transmission for the cellular uplink transmission, that is, to make the interference of the D2D communication in the cellular uplink communication be zero, it requires:

$$H_B W_D = 0$$

That is to say, when the precoding matrix $W_D$ selected by the UE satisfies $H_B W_D = 0$, the interference of the D2D communication in the cellular uplink communication can be zero.

To this end, the UE may obtain precoding matrices for the cellular uplink communication and the D2D communication in following manner:

Singular value decomposition is performed on $H_B$, which is:

$$H_B = U_B \begin{bmatrix} \Sigma_B & 0 \\ 0 & 0 \end{bmatrix} [V_B^{(1)} \quad V_B^{(0)}]^H$$

where $\Sigma_B$ is a diagonal matrix formed of a non-zero singular value of HB; $V_B^{(1)}$ is a singular vector formed of a non-zero singular value; $V_B^{(0)}$ is a singular vector formed of a zero singular value and is a null-space orthogonal basis of $H_B$; and $U_B$ is a unitary matrix.

When $W_D = V_B^{(0)}$, $H_B W_D = 0$. Therefore, the UE adopts a precoding matrix $W_D = V_B^{(0)}$ to perform precoding processing on the data transmitted in the D2D communication, so as to make the interference of the D2D communication in the cellular uplink communication be zero, and eliminate the interference caused by the D2D transmission for the cellular uplink transmission.

In a similar way, for the D2D transmission performed between the UE and the D2D UE, a signal received by the D2D UE is:

$$y_2 = H_D W_B S_B + H_D W_D S_D + n_D \qquad (2)$$

In equation (2), the second term $H_D W_D S_D$ is a signal that the D2D UE expects to receive; $H_D W_B S_B$ is interference caused by the cellular uplink communication for the D2D communication; and $n_D$ is noise. To eliminate the interference caused by the cellular uplink transmission for the D2D transmission, that is, to make the interference of the cellular uplink communication in the D2D communication be zero, it requires:

$$H_D W_B = 0$$

That is to say, when the precoding matrix $W_B$ selected by the UE satisfies $H_D W_B = 0$, the interference of the cellular uplink communication in the D2D communication can be zero.

To this end, in this example, singular value decomposition is performed on $H_D$, which is:

$$H_D = U_D \begin{bmatrix} \Sigma_D & 0 \\ 0 & 0 \end{bmatrix} [V_D^{(1)} \quad V_D^{(0)}]^H$$

where $\Sigma_D$ is a diagonal matrix formed of a non-zero singular value of $H_D$; $V_D^{(1)}$ is a singular vector formed of a non-zero singular value; $V_D^{(0)}$ is a singular vector formed of a zero singular value and is a null-space orthogonal basis of $H_D$; and $U_D$ is a unitary matrix.

When $W_B = V_D^{(0)}$, $H_D W_B = 0$. Therefore, the UE adopts a precoding matrix $W_B = V_D^{(0)}$ to perform precoding processing on the data transmitted in the cellular uplink communication, so as to make the interference of the cellular uplink communication in the D2D communication be zero, and eliminate the interference caused by the cellular uplink transmission to the D2D transmission.

To sum up, in the embodiment of the present invention, the UE may select the $W_B = V_D^{(0)}$ and $W_D = V_B^{(0)}$ to perform the precoding processing on the data transmitted in the cellular uplink communication and the data transmitted in the D2D communication respectively, so as to make the interference of the cellular uplink communication in the D2D communication be zero, and make the interference of the D2D communication in the cellular uplink communication be zero.

It can be understood that, the foregoing precoding matrices selected by the UE are only examples, and the precoding matrix selected by the UE is not limited in the present invention, and other precoding matrices may also be used. In addition, the precoding matrix selected by the UE not only can eliminate the interference between the cellular uplink communication and the D2D communication, but also can reduce the interference between the cellular uplink communication and the D2D communication to be lower than a set threshold.

It should be noted that, the first and second specified thresholds are not limited in the embodiment of the present invention, and persons skilled in the art may determine the first and second specified thresholds according to common knowledge in the art, the anti-interference capability of the BS and the D2D UE, experience, or the like, so as to select a suitable precoding matrix, and reduce the interference between the cellular uplink communication and the D2D communication to an interference range so that the two kinds of normal communication are not affected.

It can be understood that, the foregoing precoding processing of the UE is described through a case that the UE performs the cellular uplink communication with the BS and the UE performs the D2D transmission with a D2D UE, and can be further extended to and used in a scenario that the UE performs the cellular uplink communication with the BS and the UE performs D2D transmission with multiple D2D UEs.

Although the UE may eliminate or reduce the interference between the cellular uplink communication and the D2D communication through the precoding processing, because maximum transmit power of the UE is fixed, and the UE intends to perform the cellular uplink communication with the BS and perform the D2D communication with the D2D UE, the UE definitely needs to rationally allocate transmit power. Optionally, the UE may adopt the following power allocation solution:

Because the D2D communication is short-distance transmission, path loss is relatively small, and the requirement of transmit power is relatively low, the UE first performs power control on the D2D transmission, determines transmit power of the D2D communication according to path loss of a D2D communication link, and uses the determined transmit power of the D2D communication to perform the D2D communication with the D2D UE.

Specifically, the UE sets transmit power $P_{D2D}$ of the D2D communication between the UE and the D2D UE to a sum of specified transmission power $P_{D2D}^0$ of the D2D communication and path loss compensation $\alpha \cdot PL_{D2D}$ of the D2D communication link:

$$P_{D2D} = P_{D2D}^0 + \alpha \cdot PL_{D2D}$$

where $PL_{D2D}$ is path loss of a D2D link, and $\alpha$ is a D2D transmission path loss supplement factor.

The specified transmission power $P_{D2D}^0$ is specific transmission power which is of the D2D communication and preset for the UE, and can be set by persons skilled in the art, for example, according to a communication standard. In some embodiments, persons skilled in the art can adjust $P_{D2D}^{0}$ of the UE.

Then, the UE determines transmit power of the cellular uplink communication according to the determined transmit power of the D2D communication and path loss of a cellular uplink communication link, and uses the determined transmit power of the cellular uplink communication to perform the cellular uplink communication with the base station.

Specifically, because maximum transmit power Pmax of the UE is fixed, maximum transmit power for the UE to perform the cellular uplink communication with the BS is $P_{max}-P_{D2D}$.

In this case, if a sum of specified transmission power $P_{cellular}^{0}$ of the cellular uplink communication and path loss compensation $\beta \cdot PL_{cellular}$ of the cellular uplink communication link is less than $P_{max}-P_{D2D}$, the UE sets the transmit power of the cellular uplink communication between the UE and the BS to $P_{cellular}^{0}+\beta \cdot PL_{cellular}$; otherwise, the UE sets the transmit power of the cellular uplink communication between the UE and the BS to $P_{max}-P_{D2D}$.

The specified transmission power $P_{cellular}^{0}$ is specific transmission power which is of the cellular uplink communication and preset for the UE, and can be set by persons skilled in the art, for example, according to a communication standard. In some embodiments, persons skilled in the art can adjust $P_{cellular}^{0}$ of the UE.

Figure 2:
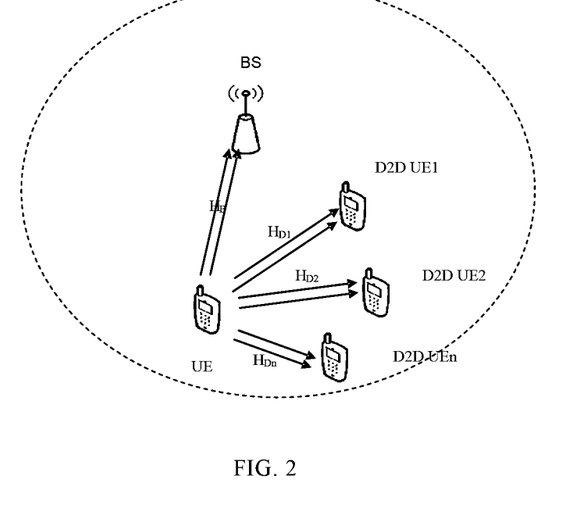
FIG. 2 is a schematic diagram of an embodiment of a MIMO wireless communication system according to the present invention.

FIG. 2 is a schematic diagram of another embodiment of a MIMO wireless communication system according to an embodiment of the present invention, which includes a BS, a UE (first UE) and n D2D UEs (second UE) in total: D2D UE1, D2D UE2, ..., and D2D UEn, where the n is greater than or equal to 2. The UE performs cellular uplink communication with the BS, and the UE performs D2D communication with each D2D UE, so as to form MIMO communication. The same time-frequency resource is used in the cellular uplink communication between the UE and the BS and the D2D communication between the UE and each D2D UE.

To eliminate or reduce interference between the cellular uplink communication and the D2D communication, this embodiment may use the same precoding processing manner as the foregoing embodiment. An example is taken for description.

It is assumed that a cellular uplink transmission channel from the UE to the BS is $H_B$, transmission data is $S_B$, and a precoding matrix is $W_B$; and it is assumed that the UE performs D2D communication with the n D2D UEs, a D2D link channel between the UE and D2D UEi is $H_{Di}$, D2D transmission data is $S_{Di}$, and a precoding matrix is $W_{Di}$, where i is an integer greater than 0 and less than or equal to n, so that for cellular uplink transmission performed between the UE and the BS, a signal received by the BS is:

$$y_B = H_B W_B S_B + \sum_{i=1}^{N} H_B W_{Di} S_{Di} + n_B \quad (3)$$

and for D2D transmission performed between the UE and D2D UEi, a signal received by D2D UEi is:

$$y_i = H_{Di} W_B S_B + H_{Di} W_{Di} S_{Di} + \sum_{j=1, j \neq i}^{N} H_{Di} W_{Dj} S_{Dj} + n_{Di} \quad (4)$$

In equation (3), the first term $H_B W_B S_B$ is a signal that the BS expects to receive, $$\sum_{i=1}^{N} H_B W_{Di} S_{Di}$$

is interference caused by the D2D communication between the UE and D2D UEi, and $n_B$ is noise. To eliminate the interference caused by the D2D transmission between the UE and D2D UEi for the cellular uplink transmission, that is, to make the interference of the D2D communication between the UE and D2D UEi in the cellular uplink communication be zero, it requires:

$$H_B W_{Di} = 0$$

That is to say, when a precoding matrix $W_{Di}$ selected by the UE satisfies $H_B W_{Di}=0$, the interference of the D2D communication in the cellular uplink communication can be zero.

In a similar way, in equation (4), the second term $H_{Di} W_{Di} S_{Di}$ is a signal that D2D UEi expects to receive; $H_{Di} W_B S_B$ is interference caused by the cellular uplink communication for the D2D communication;

$$\sum_{j=1, j \neq i}^{N} H_{Di} W_{Dj} S_{Dj}$$

is interference caused by the D2D communication between the UE and another D2D UE; and $n_{Di}$ is noise. To eliminate the interference, it requires:

$$H_{Di} W_B 0, H_{Di} W_{Dj} = 0 (i \neq j)$$

where j is an integer greater than 0 and less than or equal to n.

That is to say, when the precoding matrix $W_B$ selected by the UE satisfies $H_{Di} W_B=0$, the interference of the cellular uplink communication in the D2D communication between the UE and D2D UEi can be zero. When the precoding matrix $W_{Di}$ selected by the UE satisfies $H_{Di} W_{Dj}=0 (i \neq j)$, the interference of the D2D communication between the UE and another D2D UE in the D2D communication between the UE and D2D UEi can be zero.

To this end, the UE may obtain precoding matrices for the cellular uplink communication and the D2D communication between the UE and D2D UEi in following manner:

An interference channel of cellular uplink link transmission from the UE to the BS to transmission of another D2D UEi is:

$$\tilde{H}_B = [H_{D1}^T H_{D2}^T \ldots H_{DN}^T]^T$$

Singular value decomposition is performed on $\tilde{H}_B$, which is:

$$\tilde{H}_B = U_B \begin{bmatrix} \Sigma_B & 0 \\ 0 & 0 \end{bmatrix} [V_B^{(1)} \ V_B^{(0)}]^H$$

where $\Sigma_B$ is a diagonal matrix formed of a non-zero singular value of $\tilde{H}_B$; $V_B^{(1)}$ is a singular vector formed of a non-zero singular value; $V_B^{(0)}$ is a singular vector formed of a zero singular value and is a null-space orthogonal basis of $\tilde{H}_B$; and $U_B$ is a unitary matrix.

When $W_B=V_B^{(0)}$, $H_{Di}W_B=0$. Therefore, the UE adopts a precoding matrix $W_B=V_B^{(0)}$ to perform precoding processing on data transmitted in the cellular uplink communication, so that the interference of the cellular uplink communication in the D2D communication between the UE and D2D UEi is zero, and the interference of the cellular uplink communication in the D2D communication between the UE and D2D UEi is eliminated.

An interference channel of the D2D transmission between the UE and D2D UEi to the cellular uplink link transmission from the UE to the BS and to the transmission of another D2D UE is:

$$\tilde{H}_{Di}=[H_B^T H_{D1}^T H_{D2}^T \ldots H_{Di-1}^T H_{Di+1}^T \ldots H_{DN}^T]^T$$

Singular value decomposition is performed on $\tilde{H}_{Di}$, which is:

$$\tilde{H}_{Di} = U_{Di} \begin{bmatrix} \Sigma_{Di} & 0 \\ 0 & 0 \end{bmatrix} [\, V_{Di}^{(1)} \; V_{Di}^{(0)} \,]^H$$

where $\Sigma_{Di}$ is a diagonal matrix formed of a non-zero singular value of $\tilde{H}_{Di}$; $V_{Di}^{(1)}$ is a singular vector formed of a non-zero singular value; $V_{Di}^{(0)}$ is a singular vector formed of a zero singular value and is a null-space orthogonal basis of $\tilde{H}_{Di}$; and $U_{Di}$ is a unitary matrix.

When $W_{Di}=V_{Di}^{(0)}$, $H_{Dj}W_{Di}=0(i\neq j)$, $H_B W_{Di}=0$. Therefore, the UE adopts a precoding matrix $W_{Di}=V_{Di}^{(0)}$ to perform precoding processing on data transmitted in the D2D communication between the UE and D2D UEi, so as to eliminate the interference caused by the D2D communication between the UE and D2D UEi for the cellular uplink communication from the UE to the BS, and the interference caused by the D2D communication between the UE and D2D UEi for D2D transmission between the UE and another D2D UE.

Figure 3:
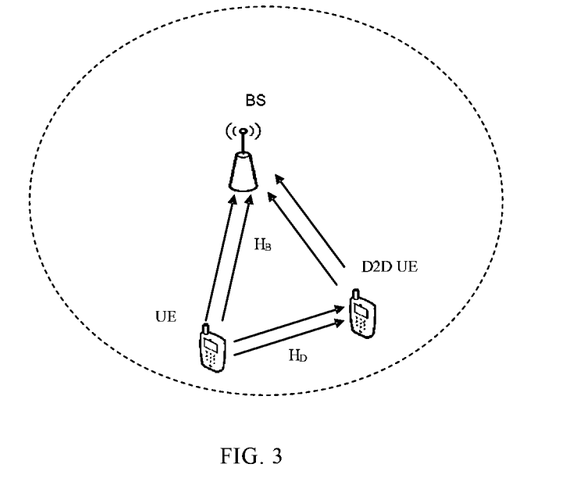
FIG. 3 is a schematic diagram of an embodiment of a MIMO wireless communication system according to the present invention.

FIG. 3 is a schematic diagram of another embodiment of a MIMO wireless communication system according to an embodiment of the present invention. The MIMO wireless communication system in this embodiment includes a BS, a UE (first UE), and a D2D UE (second UE). A difference from the foregoing embodiments is that, in this embodiment, in addition to that the UE performs cellular uplink communication with the BS and the UE performs D2D communication with the D2D UE, the D2D UE also performs cellular uplink communication with the BS. The same time-frequency resource is used in the foregoing three kinds of communication. That is to say, through a D2D link and at the same time when performing data transmission with the BS through a cellular uplink link, the UE performs space division multiplexing on the same time-frequency resource used in the foregoing cellular communication with the D2D UE, so as to form a multiple-input multiple-output system, and at the same time, the BS further schedules the D2D UE to perform the cellular uplink transmission on the time-frequency resource, that is, the UE and the D2D UE further perform the cellular uplink virtual MIMO transmission at the same time.

In this embodiment, the cellular uplink communication and the D2D communication of the UE may adopt the same precoding processing and power allocation manners as the foregoing embodiments, and reference may be made to foregoing descriptions for specific details, which are not elaborated herein. For the D2D UE, because the D2D UE further performs the cellular uplink transmission with the BS on the same time-frequency resource at the same time when receiving D2D transmission data sent by the UE to the D2D UE, interference is caused for the D2D UE receiving the D2D data. Therefore, the D2D UE first needs to eliminate self-interference caused by the cellular uplink transmission, that is, to perform interference elimination on a signal of the cellular uplink communication between the D2D UE and the BS, and then receives and modulates and decodes the D2D data transmitted by the UE.

Figure 4:
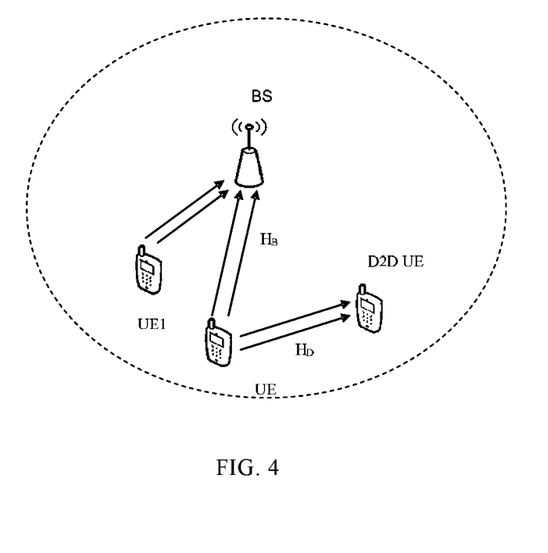
FIG. 4 is a schematic diagram of an embodiment of a MIMO wireless communication system according to the present invention.

FIG. 4 is a schematic diagram of another embodiment of a MIMO wireless communication system according to an embodiment of the present invention. The MIMO wireless communication system in this embodiment includes a BS, a UE (first UE), and a D2D UE (second UE). A difference from the foregoing embodiments is that, in this embodiment, the MIMO wireless communication system further includes a UE1 (third UE), in addition to that the UE performs cellular uplink communication with the BS and the UE performs D2D communication with the D2D UE, the UE1 also performs cellular uplink communication with the BS, and the same time-frequency resource is used in the foregoing three kinds of communication. That is to say, through a D2D link at the same time when performing data transmission with the BS through a cellular uplink link, the UE performs space division multiplexing on the same time-frequency resource used in the foregoing cellular communication with the D2D UE, so as to form a multiple-input multiple-output system. The BS also performs transmission on the time-frequency resource by scheduling the UE1, that is, the UE1 and the UE perform cellular uplink transmission on the same time-frequency resource, so as to form virtual MIMO, and the cellular uplink transmission between the UE and the BS and D2D transmission between the UE and the D2D UE form MIMO transmission based on the UE.

In this embodiment, the cellular uplink communication of the UE1 may cause interference for the D2D transmission between the UE and the D2D UE. To effectively avoid and restrain the interference, a distance between the UE1 and the UE may be greater than a specified distance, that is, the BS selects a UE far from the UE to perform uplink virtual MIMO transmission together when scheduling a UE that performs cellular uplink virtual MIMO transmission. The specified distance is not limited in this embodiment, and persons skilled in the art may perform selection according to common knowledge in the art and commonly used technical means, so as to guarantee that the distance between the UE1 and the UE can make ignorable the interference of the cellular uplink communication of the UE1 in the D2D communication between the UE and the D2D UE.

In addition to controlling the distance between the UE and the UE1, to effectively avoid and restrain the interference of the cellular uplink communication of the UE1 in the D2D transmission between the UE and the D2D UE, the UE1 may adopt a precoding processing manner adopted by the UE in the foregoing embodiments, and measure a channel between the UE1 and the D2D UE, so as to limit cellular uplink transmission data between the UE1 and the BS to a null space of a D2D transmission channel between the UE1 and the D2D UE, that is, perform precoding processing, by using a specific precoding matrix, on data transmitted in the cellular uplink communication between the UE1 and the BS, to restrain the interference of the cellular uplink transmission between the UE1 and the BS in the D2D link, so that the interference of the cellular uplink communication between the UE1 and the BS in the D2D transmission between the UE and the D2D UE is zero or lower than a specified threshold. Reference may be made to foregoing embodiments, which is not elaborated herein.

In the foregoing embodiments, the UE performs precoding processing, by selecting a specific precoding matrix, on data transmitted in the cellular uplink communication between the UE and the BS and the D2D communication between the UE and the D2D UE, so as to control the interference between the cellular uplink communication between the UE and the BS and the D2D communication between the UE and the D2D UE, that is, a cellular uplink signal and a D2D signal are distinguished in a vector space dimension. However, the present invention is not limited thereto. In an embodiment of the present invention, the UE may perform precoding processing on data transmitted in the cellular uplink communication and data transmitted in the D2D communication in a superposition coding manner. To distinguish the data transmitted in the cellular uplink communication and the data transmitted in the D2D communication, transmit power of the cellular uplink communication performed by the UE with the BS is higher than transmit power of the D2D communication performed by the UE with the D2D UE. In this way, when receiving an uplink signal of the transmitting UE, the BS directly processes a D2D signal as noise, and when the D2D UE needs to receive a signal of the D2D communication, the D2D UE first detects an uplink signal with high power, performs interference elimination and then detects a required D2D signal. Specifically, the D2D UE may learn, from the BS or the UE, a precoding matrix adopted in the cellular uplink communication between the UE and the BS, and when receiving the signal of the D2D communication, the D2D UE obtains an uplink signal of the cellular uplink communication between the UE and the BS according to the learned precoding matrix, and then performs interference elimination on the obtained uplink signal of the cellular uplink communication.

In this embodiment, optionally, the UE may adopt a zero-forcing algorithm or an MMSE (minimum mean square error) algorithm in MU-MIMO (multiple-user MIMO) to calculable precoding matrices for all D2D UEs. This step may be implemented by using the prior art. An example that the UE uses the zero-forcing algorithm is taken for description in the following:

Referring to FIG. 2, it is assumed that the UE sends N1, N2, . . . , and Nn data streams to D2D UE1, UE2, . . . , and UEn respectively, the transmitting UE selects N1, N2, . . . , and Nn antennas as receive antennas for the first, second, . . . , and $n^{th}$ D2D receiving UE according to channel information $H_{D1}$, $H_{D2}$, . . . , and $H_{Dn}$, respectively. How to select an antenna is not limited and may be performed according to a common rule in the prior art. Channel matrices of receive antennas between the UE and all the D2D UEs are marked as $T_{D1}$, $T_{D2}$, . . . , and $T_{Dn}$.

The UE calculates a precoding matrix used by the UE for the ith (i=1, 2, . . . , and n) D2D UE as follows:

$Si=[T_{D1}', T_{D2}', \ldots, \text{and } T_{D(i-1)}', T_{D(i+1)}', \ldots, \text{and } T_{Dn}']$, where ' represents a conjugate transpose of a matrix.

The UE finds Mi orthogonal bases $W_{i,1}$, $W_{i,2}$, . . . , and $W_{i,Mi}$ in a null space of a row vector of the Si, so that:

for all j=1, 2, . . . , and Mi, $W_{i,j} W_{i,j}'=1$; and
for all j≠k, $W_{i,j} W_{i,k}'=0$.

The UE uses $Pi=[W_{i,1}', W_{i,2}', \ldots, \text{and } W_{i,Ni}']$ as a precoding matrix for transmission from the UE to D2D UEi.

Optionally, if the UE does not know an uplink channel, a unit matrix is used as a precoding matrix for uplink transmission; or the BS may inform the UE of a precoding matrix used in the uplink transmission. If the transmitting UE knows the uplink channel, a precoding matrix may be determined through an existing MIMO transmission technology.

A precoding matrix and a transmitted signal that the UE gives to the BS are marked as $P_B$ and $X_B$ respectively, and a transmitted signal that the UE gives to the $i^{th}$ D2D UE is marked as Xi, so that:

a receiving signal of the BS is $Y_B=H_B(P_B X_B + P_1 X_1 + \ldots + P_n X_n) + Z_B$, where $Z_B$ represents noise; and a receiving signal of the $i^{th}$ D2D UE is $Y_i = H_{Di}(P_B X_B + P_1 X_1 + \ldots + P_n X_n) + Z_i$, where $Z_i$ represents noise.

When performing uplink signal detection, the BS does not perform any processing on a D2D signal and only uses the D2D signal as noise. A signal processing procedure of the D2D UE is as follows:

The D2D UE may obtain, from the BS or the UE, a precoding matrix for transmission from the UE to the base station.

The D2D UE first uses the D2D signal as interference, detects an uplink signal from the UE to the base station, and obtains a preliminary estimate $\hat{X}_B$ of the uplink signal $X_B$, and then demodulates and decodes $\hat{X}_B$.

The D2D UE recodes and re-modulates, in a manner of the UE, information obtained by the decoding in the foregoing step, and restores the uplink signal, so as to obtain an accurate estimate $\hat{X}_B$ of the uplink signal.

The D2D UE deletes the uplink signal from the receiving signal, that is, $\hat{Y}_i = Y_i - H_i P_B \hat{X}_B$, and estimates a required D2D signal according to $\hat{Y}_i$.

Corresponding to the foregoing MIMO wireless communication system, an embodiment of the present invention further provides a MIMO transmission method, and a UE in this method embodiment is a first UE. The method includes:

performing, by the UE, cellular uplink communication with a BS; and performing, by the UE, D2D communication with at least one second UE, where the same time-frequency resource is used in the cellular uplink communication and the D2D communication.

In the MIMO transmission method by the embodiment of the present invention, the UE not only can perform the cellular uplink communication with the BS, but also can perform the D2D communication with the second UE, that is, two UEs can directly perform communication with each other without requiring the BS to perform forwarding, which not only can effectively reduce occupancy of a BS resource, but also can effectively improve transmission efficiency and decrease a transmission delay. In addition, because the same time-frequency resource is used in the D2D communication between the UE and the second UE and the cellular uplink communication between the UE and the BS, frequency spectrum efficiency of the wireless communication system can be effectively improved.

Optionally, to effectively reduce or eliminate interference between the cellular uplink communication and the D2D communication, in an embodiment of the present invention, before the UE performs the cellular uplink communication and the D2D communication, the MIMO transmission method further includes:

using, by the UE, a first precoding matrix to perform precoding processing on data transmitted in the cellular uplink communication, so as to make interference of the cellular uplink communication in the D2D communication lower than a first specified threshold; and using, by the UE, a second precoding matrix to perform precoding processing on data transmitted in the D2D communication, so as to make interference of the D2D communication in the cellular uplink communication lower than a second specified threshold.

The UE performs precoding processing, by using specific precoding matrices (the first precoding matrix and the second precoding matrix), on the data transmitted in the cellular uplink communication and the data transmitted in the D2D communication respectively, so as to make the interference of the cellular uplink communication in the D2D communication lower than a specified threshold, and make the interference of the D2D communication in the cellular uplink communication lower than a specified threshold. Reference may be made to the foregoing embodiments for a precoding matrix selected by the UE, which is not elaborated herein.

To properly allocate transmit power of the UE, optionally, in an embodiment of the present invention, the method further includes:

determining, by the UE, transmit power of the D2D communication according to path loss of a D2D communication link; and determining, by the UE, transmit power of the cellular uplink communication according to the determined transmit power of the D2D communication and path loss of a cellular uplink communication link.

In this case, the UE uses the determined transmit power of the cellular uplink communication to perform the cellular uplink communication with the base station, and uses the determined transmit power of the D2D communication to perform the D2D communication with the second UE.

Specifically, the UE first performs power control on D2D transmission, and sets the transmit power $P_{D2D}$ of the D2D communication between the UE and the second UE to a sum of specified transmission power $P_{D2D}^0$ of the D2D communication and path loss compensation $\alpha \cdot PL_{D2D}$ of the D2D communication link:

$$P_{D2D} = P_{D2D}^0 + \alpha \cdot PL_{D2D}$$

where $PL_{D2D}$ is path loss of a D2D link, and $\alpha$ is a D2D transmission path loss supplement factor.

Because maximum transmit power $P_{max}$ of the UE is fixed, maximum transmit power of the cellular uplink communication performed between the UE and the BS is $P_{max} - P_{D2D}$.

In this case, if a sum of specified transmission power $P_{cellular}^0$ of the cellular uplink communication and path loss compensation $\beta \cdot PL_{cellular}$ of the cellular uplink communication link is less than $P_{max} - P_{D2D}$, the UE sets the transmit power of the cellular uplink communication between the UE and the BS to $P_{cellular}^0 + \beta \cdot PL_{cellular}$; otherwise, if the sum of the specified transmission power $P_{cellular}^0$ of the cellular uplink communication and the path loss compensation $\beta \cdot PL_{cellular}$ of the cellular uplink communication link is not less than $P_{max} - P_{D2D}$, the UE sets the transmit power of the cellular uplink communication between the UE and the BS to $P_{max} - P_{D2D}$.

To effectively reduce or eliminate the interference between the cellular uplink communication and the D2D communication, optionally, in an embodiment of the present invention, before the UE performs the cellular uplink communication and the D2D communication, the MIMO transmission method further includes:

performing, by the UE, precoding processing on data transmitted in the cellular uplink communication and data transmitted in the D2D communication in a superposition coding manner.

The UE uses the superposition coding manner, and therefore, to distinguish the data transmitted in the cellular uplink communication and the data transmitted in the D2D communication, transmit power used in the cellular uplink communication performed by the UE is higher than transmit power used in the D2D communication performed by the UE, so that when receiving an uplink signal of the cellular uplink communication, the BS processes a signal of the D2D communication as noise, and when receiving the signal of the D2D communication, the second UE first performs interference elimination on the uplink signal of the cellular uplink communication and then detects a D2D signal.

Figure 5:
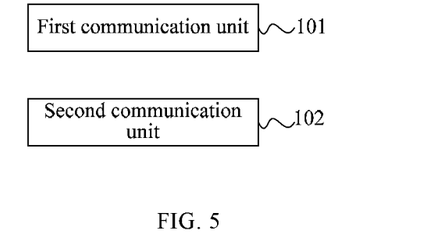
FIG. 5 is schematic diagram of an embodiment of a UE according to the present invention.

Corresponding to the foregoing MIMO wireless communication system, an embodiment of the present invention further provides a UE. As shown in FIG. 5, the UE includes:

a first communication unit 101, configured to perform cellular uplink communication with a BS; and a second communication unit 102, configured to perform D2D communication with at least one second UE, where the same time-frequency resource is used in the cellular uplink communication and the D2D communication.

The UE provided by the embodiment of the present invention not only can perform the cellular uplink communication with the BS, but also can perform the D2D communication with the second UE, that is, two UEs can directly perform communication with each other without requiring the BS to perform forwarding, which not only can effectively reduce occupancy of a BS resource, but also can effectively improve transmission efficiency and decrease a transmission delay. In addition, because the same time-frequency resource is used in the D2D communication between the UE and the second UE and the cellular uplink communication between the UE and the BS, frequency spectrum efficiency of the wireless communication system can be effectively improved.

Figure 6:
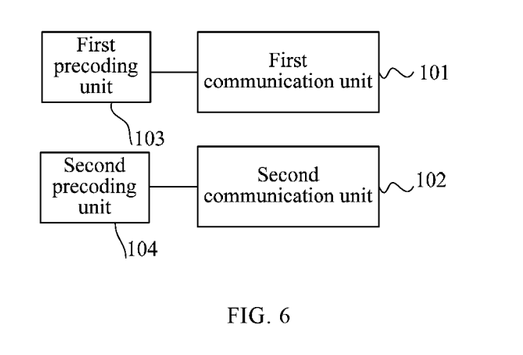
FIG. 6 is schematic diagram of an embodiment of a UE according to the present invention.

Optionally, in an embodiment of the present invention, as shown in FIG. 6, the UE further includes:

a first precoding unit 103, configured to use a first precoding matrix to perform precoding processing on data transmitted in the cellular uplink communication, so as to make interference of the cellular uplink communication in the D2D communication lower than a first specified threshold; and a second precoding unit 104, configured to use a second precoding matrix to perform precoding processing on data transmitted in the D2D communication, so as to make interference of the D2D communication in the cellular uplink communication lower than a second specified threshold.

Figure 7:
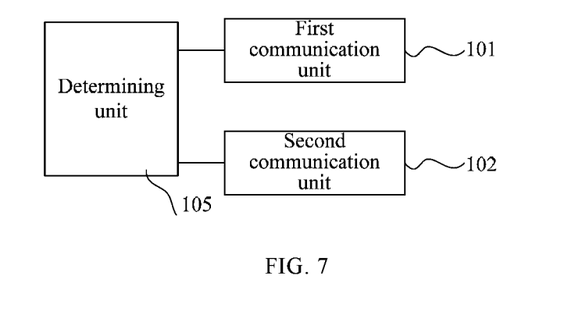
FIG. 7 is schematic diagram of an embodiment of a UE according to the present invention.

Optionally, in an embodiment of the present invention, as shown in FIG. 7, the UE further includes:

a determining unit 105, configured to determine transmit power of the D2D communication according to path loss of a D2D communication link, and determine transmit power of the cellular uplink communication according to the determined transmit power of the D2D communication and path loss of a cellular uplink communication link.

In this case, the first communication unit 101 is specifically configured to use the transmit power, which is determined by the determining unit 105 and is of the cellular uplink communication, to perform the cellular uplink communication with the base station; and the second communication unit 102 is specifically configured to use the transmit power, which is determined by the determining unit 105 and is of the D2D communication, to perform the D2D communication with the second UE.

Specifically, the transmit power which is determined by the determining unit 105 for the second communication unit 102 to perform the D2D communication is a sum of specified transmission power of the D2D communication and path loss compensation of the D2D communication link. If a sum of specified transmission power of the cellular uplink communication and path loss compensation of the cellular uplink communication link is less than maximum transmit power of the cellular uplink communication, the transmit power which is determined by the determining unit 105 for the first communication unit 101 to perform the cellular uplink communication is the sum of the specified transmission power of the cellular uplink communication and the path loss compensation of the cellular uplink communication link; otherwise, the transmit power which is determined by the determining unit 105 for the first communication unit 101 to perform the cellular uplink communication is the maximum transmit power of the cellular uplink communication, where the maximum transmit power of the cellular uplink communication is a difference between maximum transmit power of the UE and the transmit power of the D2D communication.

Figure 8:
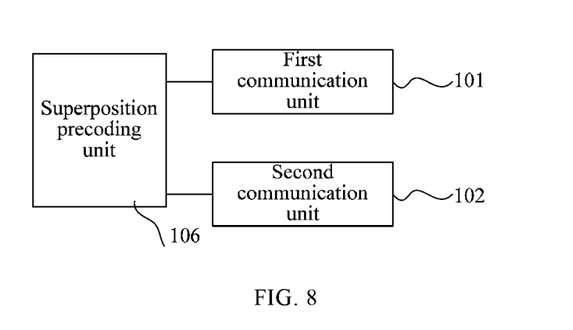
FIG. 8 is schematic diagram of an embodiment of a UE according to the present invention.

Optionally, in an embodiment of the present invention, as shown in FIG. 8, the UE further includes:

a superposition precoding unit 106, configured to perform precoding processing on data transmitted in the cellular uplink communication and data transmitted in the D2D communication in a superposition coding manner.

In this case, the transmit power of the cellular uplink communication performed by the first communication unit 101 is higher than the transmit power of the D2D communication performed by the second communication unit 102.

Persons of ordinary skill in the art may understand that all or part of the processes of the methods in the embodiments may be implemented by a computer program instructing relevant hardware. The program may be stored in a computer readable storage medium. When the program is run, the steps of the foregoing method embodiments are performed. The foregoing storage medium may be any medium that is capable of storing program codes, such as a ROM, a RAM, a magnetic disk or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A multiple-input multiple-output transmission method comprising:

performing, by a first user equipment, cellular uplink communication with a base station;

performing, by the first user equipment, and at the same time as the cellular uplink communication, device-to-device communication with at least one second user equipment, wherein a same time-frequency resource is used for the cellular uplink communication and the device-to-device and the device-to-device and the cellular uplink communications are separate communications;

using, by the first user equipment, a first precoding matrix to perform precoding processing on data transmitted in the cellular uplink communication, so as to make interference of the cellular uplink communication in the device-to-device communication lower than a first specified threshold, where the first precoding matrix is set by a channel used by the device-to-device communication; and using, by the first user equipment, a second precoding matrix to perform precoding processing on data transmitted in the device-to-device communication, so as to make interference of the device-to-device communication in the cellular uplink communication lower than a second specified threshold, where the second precoding matrix is set by a channel used by the cellular uplink communication.

2. The transmission method according to claim 1, further comprising:

determining, by the first user equipment, transmit power of the device-to-device communication according to path loss of a device-to-device communication link; and determining, by the first user equipment, transmit power of the cellular uplink communication according to the determined transmit power of the device-to-device communication and path loss of a cellular uplink communication link, wherein the performing, by the first user equipment, the cellular uplink communication with the base station comprises:

using, by the first user equipment, the determined transmit power of the cellular uplink communication to perform the cellular uplink communication with the base station; and the performing, by the first user equipment, the device-to-device communication with the at least one second user equipment comprises:

using, by the first user equipment, the determined transmit power of the device-to-device communication to perform the device-to-device communication with the second user equipment.

3. The transmission method according to claim 1, further comprising:

performing, by the first user equipment, precoding processing on data transmitted in the cellular uplink communication and data transmitted in the device-to-device communication in a superposition coding manner, wherein transmit power used in the cellular uplink communication performed by the first user equipment is higher than transmit power used in the device-to-device communication performed by the user equipment, so as to enable the base station to process a signal of the device-to-device communication as noise, when receiving an uplink signal of the cellular uplink communication, and to enable the second user equipment to first perform interference elimination on the uplink signal of the cellular uplink communication, when receiving the signal of the device-to-device communication.

4. A user equipment comprising: a memory, and a processor coupled to the memory, which includes processor-executable instruction that when executed causes the processor to implement the following operations:

performing cellular uplink communication with a base station;

performing at the same time as the cellular uplink communication, device-to-device communication with at least one second user equipment, wherein a same time-frequency resource is used in the cellular uplink communication and the device-to-device and device-to-device cellular uplink communications are separate communications;

using a first precoding matrix to perform precoding processing on data transmitted in the cellular uplink communication, so as to make interference of the cellular uplink communication in the device-to-device communication lower than a first threshold, where the first precoding matrix is set by a channel used by the device-to-device communication; and using a second precoding matrix to perform precoding processing on data transmitted in the device-to-device communication, so as to make interference of the device-to-device communication in the cellular uplink communication lower than a second specified threshold, where the second precoding matrix is set by a channel used by the cellular uplink communication.

5. The user equipment according to claim 4, wherein the operations further comprises: determining transmit power of the device-to-device communication according to path loss of a device-to-device communication link, and determining transmit power of the cellular uplink communication according to the determined transmit power of the device-to-device communication and path loss of the cellular uplink communication link, wherein the transmit power is used and determined by the processor and is of the cellular uplink communication, to perform the cellular uplink communication with the base station; and the transmit power is used and determined by the processor and is of the device-to-device communication, to perform the device-to-device communication with the second user equipment.

6. The user equipment according to claim 4, wherein the operations further comprises: performing precoding processing on data transmitted in the cellular uplink communication and data transmitted in the device-to-device communication in a superposition coding manner, wherein transmit power of the cellular uplink communication is higher than transmit power of the device-to-device communication.

7. A multiple-input multiple-output wireless communication system comprising:

a base station, a first user equipment, and at least one second user equipment, wherein the first user equipment performs cellular uplink communication with the base station, and performs at the same time as the cellular uplink communication, device-to-device communication with the at least one second user equipment, and a same time-frequency resource is used for the cellular uplink communication between the first user equipment and the base station and the device-to-device communication between the first user equipment and the second user equipment, where the device-to-device and cellular uplink communications are separate communications;

the first user equipment uses a first precoding matrix to perform precoding processing on data transmitted in the cellular uplink communication, so as to make interference of the cellular uplink communication in the device-to-device communication lower than a first specified threshold where the first precoding matrix is set by a channel used by the device-to-device communication; and the first user equipment uses a second precoding matrix to perform precoding processing on data transmitted in the device-to-device communication, so as to make interference of the device-to-device communication in the cellular uplink communication lower than a second specified threshold, where the second precoding matrix is set by a channel used by the cellular uplink communication.

8. The wireless communication system according to claim 7, wherein the first user equipment determines transmit power of the device-to-device communication according to path loss of a device-to-device communication link, and uses the determined transmit power of the device-to-device communication to perform the device-to-device communication with the second user equipment; and the first user equipment determines transmit power of the cellular uplink communication according to the determined transmit power of the device-to-device communication and path loss of a cellular uplink communication link, and uses the determined transmit power of the cellular uplink communication to perform the cellular uplink communication with the base station.

9. The wireless communication system according to claim 7, wherein the second user equipment performs cellular uplink communication with the base station;

the same time-frequency resource is used in the cellular uplink communication between the first user equipment and the base station, the device-to-device communication between the first user equipment and the second user equipment, and the cellular uplink communication between the second user equipment and the base station; and when receiving a signal of the device-to-device communication, the second user equipment performs interference elimination on a signal of the cellular uplink communication between the second user equipment and the base station.

10. The wireless communication system according to claim 7, wherein the first user equipment performs precoding processing on data transmitted in the cellular uplink communication and data transmitted in the device-to-device communication in a superposition coding manner;

transmit power of the cellular uplink communication performed by the first user equipment is higher than transmit power of the device-to-device communication performed by the first user equipment;

when receiving an uplink signal of the cellular uplink communication, the base station processes a signal of the device-to-device communication as noise; and when receiving the signal of the device-to-device communication, the second user equipment first performs interference elimination on the uplink signal of the cellular uplink communication.

11. The wireless communication system according to claim 10, wherein the second user equipment learns, from the base station or the first user equipment, a precoding matrix used in the cellular uplink communication; and when receiving the signal of the device-to-device communication, the second user equipment obtains the uplink signal of the cellular uplink communication according to the learned precoding matrix, and then performs interference elimination on the obtained uplink signal of the cellular uplink communication.

12. The wireless communication system according to claim 7, wherein the wireless communication system further comprises a third user equipment, wherein the third user equipment performs cellular uplink communication with the base station;

the same time-frequency resource is used in the cellular uplink communication between the third user equipment and the base station, the cellular uplink communication between the first user equipment and the base station, and the cellular uplink communication between the second user equipment and the base station; and a distance between the third user equipment and the first user equipment is greater than a specified distance.

13. The wireless communication system according to claim 7, wherein the wireless communication system further comprises a third user equipment, wherein the third user equipment performs cellular uplink communication with the base station;

the same time-frequency resource is used in the cellular uplink communication between the third user equipment and the base station, the cellular uplink communication between the first user equipment and the base station, and the cellular uplink communication between the second user equipment and the base station; and the third user equipment performs, by using a specific precoding matrix, precoding processing on data transmitted in the cellular uplink communication between the third user equipment and the base station, so as to make interference of the cellular uplink communication between the third user equipment and the base station in the device-to-device communication be zero or lower than a specified threshold.

\* \* \* \* \*